United States Patent [19]
Van de Brink

[11] Patent Number: 5,803,057
[45] Date of Patent: Sep. 8, 1998

[54] METHOD AND APPARATUS FOR DOSING A GASEOUS FUEL

[75] Inventor: Alfred Van de Brink, Barneveld, Netherlands

[73] Assignee: Autogastechniek Holland B.V., Netherlands

[21] Appl. No.: 693,264

[22] Filed: Sep. 20, 1996

[30] Foreign Application Priority Data

Feb. 18, 1994 [NL] Netherlands ............................ 9400246

[51] Int. Cl.[6] .......................... F02D 41/00; F02M 21/02
[52] U.S. Cl. .......................................... 123/527; 123/472
[58] Field of Search .................... 123/527, 472, 123/478, 480

[56] References Cited

U.S. PATENT DOCUMENTS

| | | | |
|---|---|---|---|
| 4,430,978 | 2/1984 | Lewis et al. ............................ | 123/478 |
| 4,537,172 | 8/1985 | Kanehara ................................ | 123/527 |
| 4,638,777 | 1/1987 | Fanner .................................... | 123/277 |
| 4,641,625 | 2/1987 | Smith ..................................... | 123/575 |
| 5,136,986 | 8/1992 | Jensen ................................ | 123/27 GE |
| 5,367,999 | 11/1994 | King et al. ............................. | 123/458 |
| 5,533,492 | 7/1996 | Willey et al. ........................... | 123/681 |

FOREIGN PATENT DOCUMENTS

| | | |
|---|---|---|
| 071588 | 2/1983 | European Pat. Off. . |
| 262259 | 4/1988 | European Pat. Off. . |
| 1437449 | 7/1966 | France . |
| 2594889 | 8/1987 | France . |
| 8303120 | 9/1983 | WIPO . |

OTHER PUBLICATIONS

Wearden, "Systems Concepts for Engine Management", *Automotive Engineer*, vol. 19, No. 4, Aug. 1984, p. 80–82.

De Filippis, "Elektronische Analoge Operatoren: Een Vierkantsworteltrkker", *Polytechnisch Tijdschrift*, vol. 125, No. 6, Mar. 1, 1970, pp. 222–231.

Angerhofer, "Cryogenic Instrumentation", *Control Engineering*, vol. 112, No. 11, Nov. 1, 1965, p. 77.

*Primary Examiner*—Tony M. Argenbright
*Assistant Examiner*—Hieu T. Vo
*Attorney, Agent, or Firm*—Webb Ziesenheim Bruening Logsdon Orkin & Hanson, P.C.

[57] ABSTRACT

A method and apparatus for supplying a gaseous fuel to a combustion engine is described. A required fuel flow is calculated, an actual fuel flow is measured, and a fuel flow control signal is adapted if a difference between the required and actual fuel flow is detected. The fuel flow may be measured using a differential pressure measurement. The fuel flow control signal and associated actual fuel flow may be stored in a continuously updated memory. The apparatus includes a pulse width modulation valve arranged in a fuel line, a fuel flow measurement assembly arranged downstream of the valve, and a device for generating a control signal for the valve. The control signal generating device is supplied with feedback from the flow measurement assembly and includes a continuously updated table for storing control signals and associated fuel flows.

19 Claims, 7 Drawing Sheets

METHOD AND APPARATUS FOR DOSING A GASEOUS FUEL

BACKGROUND OF THE INVENTION

The invention relates to a method and apparatus for dosed supply to a combustion engine of a fuel which is gaseous in ambient conditions, as described in the pre-characterizing part of the independent claims. Such a method and apparatus are known from U.S. Pat. No. 4,537,172.

In a known method (U.S. Pat. No. 5,150,685), the starting point is a combustion engine provided with an electronically controlled petrol injection system. An injection signal for the petrol injectors is herein calculated by the electronic control on the basis of measured values of a number of operating parameters of the engine such as rotation speed, accelerator pedal position and quality of the exhaust gases. This petrol injection signal is then read and converted to an injection signal for an LPG injector by correcting the petrol injection signal for the differences in the desired mixture ratio between petrol and LPG. The LPG injection signal is finally fed to an LPG injector of the pulse width modulation type which opens and closes with an opening duration and frequency controlled by the injection signal. The LPG flow dosed by the valve is in principle directly proportional to the frequency and the length of the pulse actuating opening of the valve.

In practice this known method is found nevertheless to have a number of drawbacks. The quantity of LPG flowing through the valve as a function of the opening duration and frequency does not for instance show any linear relation, while this relation can moreover differ from valve to valve as a result of unavoidable tolerances in the manufacture of the valves. Variations also occur during use of the valve as a result of wear. The consequence is that the known method results in practice in an unsatisfactory and non-reproducible dosaging behaviour.

The invention therefore has for its object to provide a method and apparatus of the described type, wherein the above mentioned drawbacks do not occur. This is achieved according to the invention with the features of the characterizing part of the independent claims.

Preferably applied variants of the method and apparatus according to the invention are described in the dependent claims.

BRIEF DESCRIPTION OF THE DRAWINGS

The invention is now elucidated in the light of a number of embodiments, wherein reference is made to the annexed drawings in which corresponding components are designated with the same reference numerals, and in which.

DESCRIPTION OF THE PREFERRED EMBODIMENTS

Figure 1:
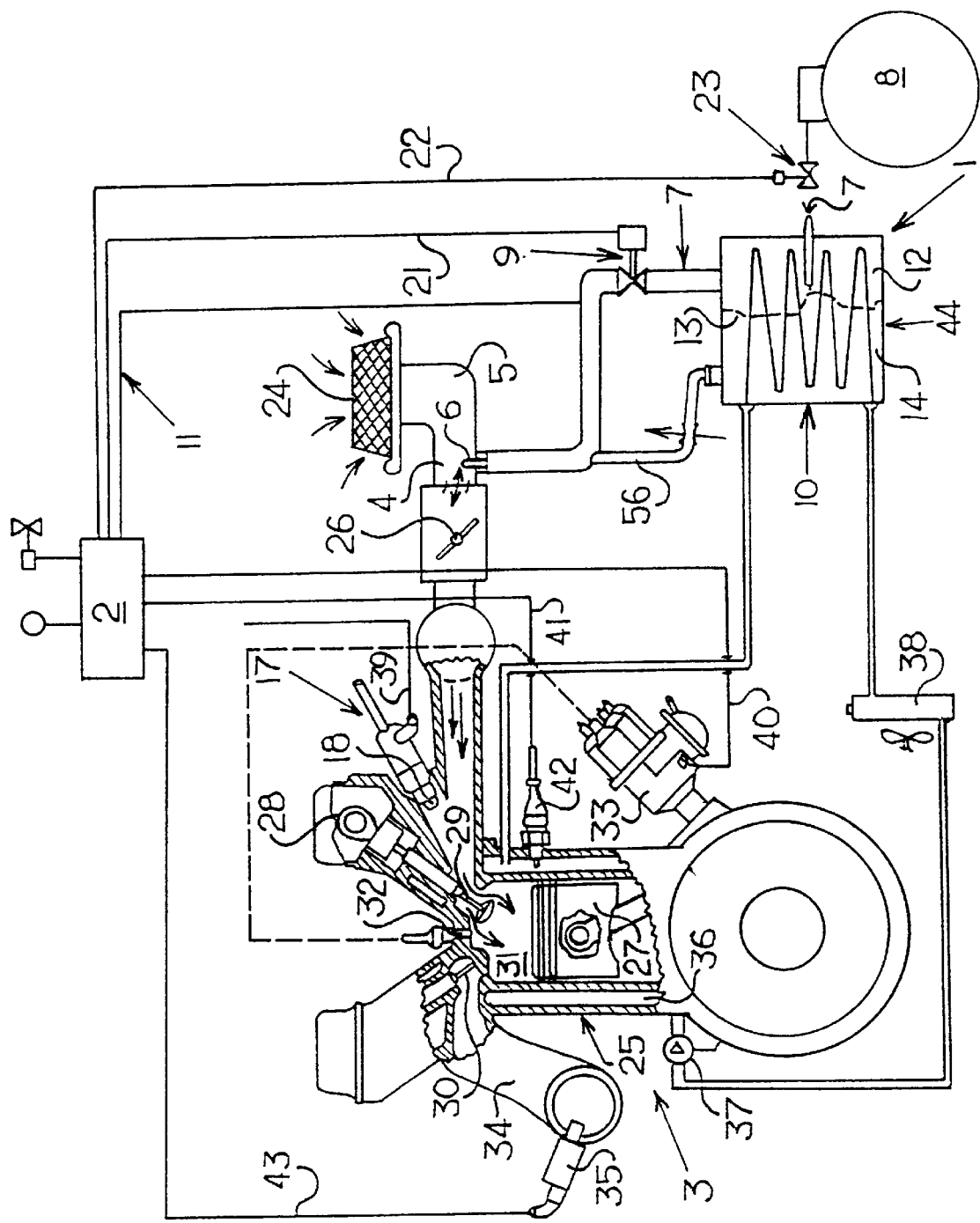
FIG. 1 shows a partly cut away, schematic view of a combustion engine with a petrol injection system and an injection system for fuel which is gaseous under ambient conditions.

An apparatus 1 (FIG. 1) for dosed supply to a combustion engine 3 provided with an electronic control system 2 of a quantity of fuel 4 that is vaporous in ambient conditions is provided with at least one injection nozzle 6 arranged in an air intake channel 5 of the engine 3. The injection nozzle 6 is connected by a supply line 7 to a fuel container 8 in which the fuel 4 is stored under a pressure such that it is in liquid state. Incorporated in the supply line 7 are dosing means 9 which are connected by a first control line 21 to the control system 2 and controllable thereby. Also incorporated in supply line 7 is a closing valve 23 which is connected by a second control line 22 to the engine control system 2 and controllable thereby. Finally, detecting and feedback means 11 connected to the control system 2 are arranged in the supply line 7.

The air intake channel 5 connects an air intake aperture 24 to at least one cylinder 25. Arranged in usual manner in intake channel 5 is a rotatable throttle valve 26 which is connected to the accelerator pedal or throttle and which regulates the feed of combustion air to cylinder 25. In the embodiment shown, the combustion engine 3 is a conventional four-stroke Otto engine with one or more cylinders 25 in which moves in each case a piston 27 arranged on a crankshaft (not shown), with inlet and outlet valves 29 respectively 30 actuable by camshafts 28. In a combustion chamber 31 formed by piston 27 and cylinder 25 is arranged a spark plug 32 which is connected to a distributor 33. Gases burnt in the combustion chamber 31 leave engine 3 through an outlet channel 34 in which is arranged a so-called lambda sensor 35. The operating temperature of engine 3 is controlled by means of a cooling system in which a cooling liquid 36 is circulated by a pump 37 and generates the absorbed heat in a radiator 38.

The engine 3 is further provided with an injection device 17 for a fuel such as petrol which is liquid in ambient conditions. This device 17 is provided with one or more injection nozzles 18 debouching into the air channel 5 in the vicinity of the inlet valve 29. The petrol injection device 17 is connected over a third control line 39 to a separate electronic control system (not shown) and is controllable thereby.

In order to control the LPG injection, the system 2 makes use of different input signals. For this purpose the engine control system 2 is connected over a first input line 40 to the distributor 33 which generates a signal corresponding to the rotation speed of the engine and is connected over a second input line 41 to a cooling liquid temperature sensor 42. The control system 2 is also connected over a third input line 43 to the lambda sensor 35. In addition the control system 2 can be further connected to sensors (not shown) which measure the position of the throttle valve 26, the quantity (mass or volume) of air supplied through intake channel 5 and the temperature of the air.

The gas injection device 1 comprises evaporating means 10 arranged between the injection nozzle and the fuel container 8 for causing evaporation of the fuel 4. The evaporating means 10 comprise in usual manner a housing 44 in which two chambers 12,14 separated by a diaphragm 13 are formed. The chamber 12 forms the actual evaporating chamber, while chamber 14 is a reference pressure chamber which is connected over a conduit 56 to the part of the fuel supply 7 located downstream of the dosing means. The temperature of the evaporator 10 is controlled by a conduit system arranged in the wall of the evaporator housing 44 and connected to the engine cooling system.

The supply of evaporated fuel to the injector 6 is regulated by the dosing means 9 under the control of the engine control system 2. The quantity of fuel to be supplied per unit of time depends inter alia on the engine load, the supplied air mass, the engine rotation speed, the engine temperature and the pressure and temperature of the fuel. These parameters are all measured and fed to the engine control system 2 which calculates therefrom a control signal for the dosing means 9.

The gas dosing means 9 take the form of a so-called pulse width modulation valve. In such a valve a closing member is continuously moved reciprocally between an end position in which it leaves a passage fully open and an end position in which it fully closes the passage. The closing member has no intermediate position. The valve is actuated by a pulse-shaped energizing signal, wherein "high" and "low" of the pulse-shaped signal correspond with the two end positions of the closing member. In contrast to a proportional valve where the volume flow through the valve depends on the extent to which a passage is opened, the volume flow in a pulse width modulation valve depends on the time that the passage is fully opened, thus, in the case of a valve which is closed in non-energized state, on the time the control signal is "high" and the valve energized. If the pulse frequency is high enough, a pulse width modulation valve provides over a determined period the same flow pattern 68 as a proportional valve (FIG. 3).

In the injection device according to the invention the control signal generated by the control system 2 has a frequency having a fixed relation to the rotation speed of the engine 3. Because the pulse duration can be controlled very precisely by means of a suitably chosen circuit, an accurate dosing of the vaporous fuel is achieved. At a frequency of 50 Hz (which corresponds with a rotation speed of 3,000 r.p.m.) the gas injection signal can for instance be varied in 40,000 steps from "high" over the whole pulse period (valve fully open) to "low" over the whole pulse period (valve fully closed). As the engine rotation speed increases the pulse period decreases, whereby the number of possible control steps also decreases, but within the engine speed range used in practice the accuracy of control is always amply sufficient.

Figure 4:
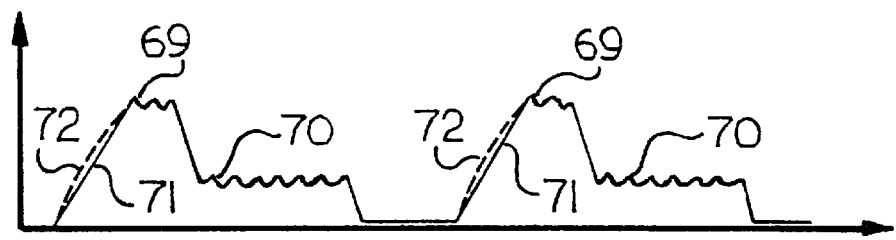
FIG. 4 shows a preferably applied actuating pulse for operating the first dosing valve of the injection device according to the invention.
Figure 5:
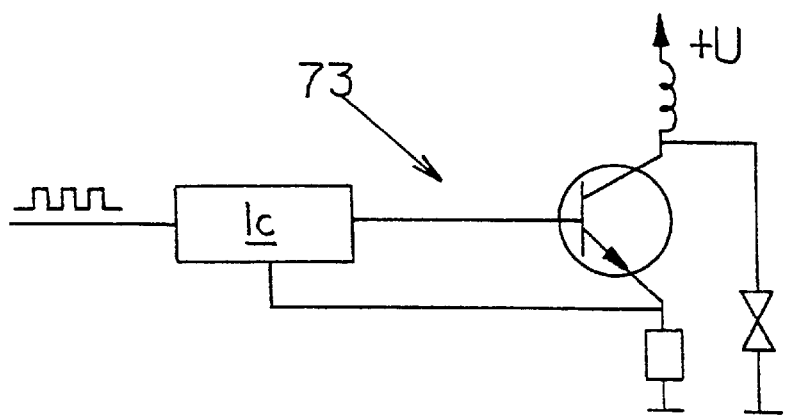
FIG. 5 shows a schematic view of a circuit for generating the actuating pulse shown in FIG. 4.

In order to limit the power consumption and heat generation during actuation of the pulse width modulation valve 9, use can be made for controlling the valves of a pulse-shaped control signal 20 which rapidly reaches a peak value 69 (FIG. 4) and subsequently falls back to a lower level 70, wherein the closing member is however still held in its end position leaving open the aperture. The pulse front 71 must preferably run as straight as possible in order to ensure as linear a movement of the closing member as possible. For this purpose the pulse front can be made slightly flatter relative to the normal, logarithmic, curved path designated in dashed lines with 72 by precise adjustment of the actuating current. Such a pulse shape can be obtained from the block-shaped control signal 20 shown in FIG. 3 by means of the circuit 73 shown in FIG. 5.

Figure 2:
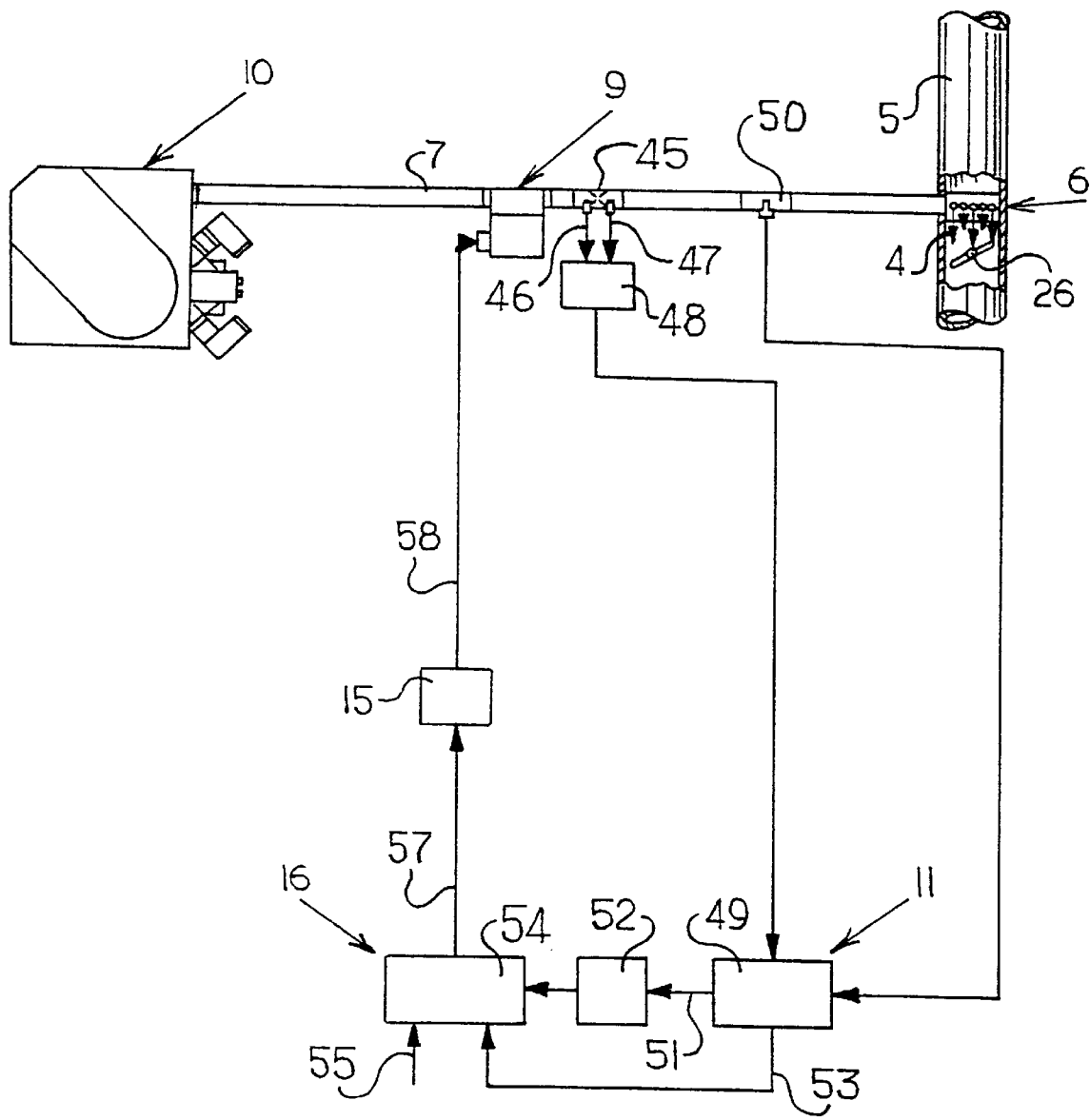
FIG. 2 shows a schematic diagram of a dosing system with feedback according to the invention.
Figure 3:
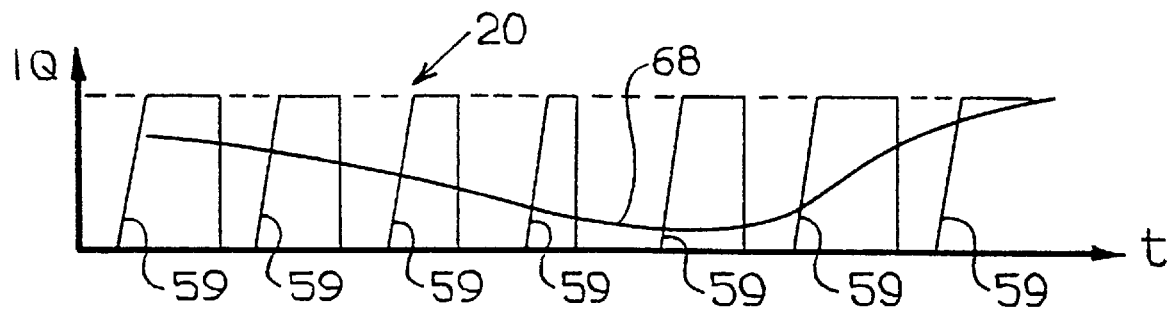
FIG. 3 is a diagram showing the relation between the actuation and flow-through of a pulse width modulation valve.
Figure 6:
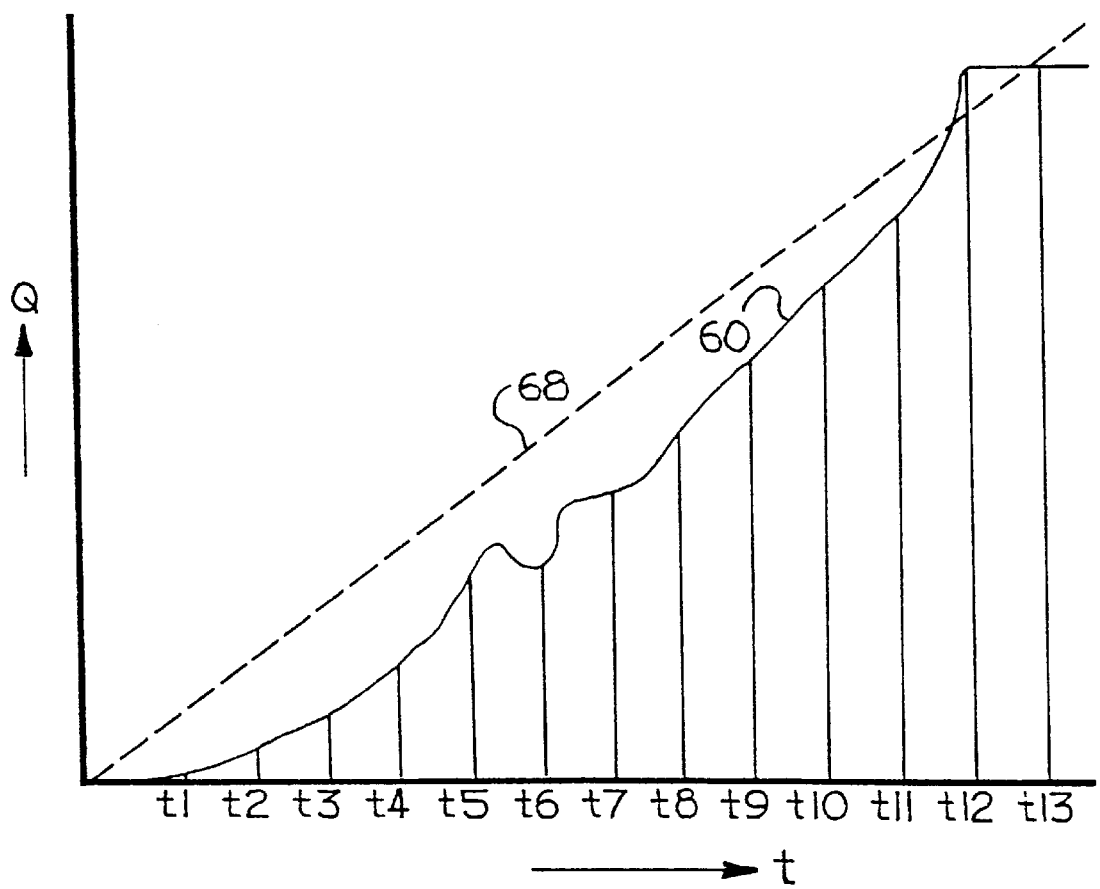
FIG. 6 is a diagram showing the idealized and actual relation between the opening duration of a pulse width modulation valve and the fuel quantity per unit of time flowing therethrough.

The line of the dosed quantity of fuel per unit of time shown in FIG. 3 as a function of the pulse width and frequency assumes a linear relation between the quantity of fuel dosed each time the valve 9 is opened and the duration of opening (FIG. 6). As a result of inter alia mass inertia effects of the moving parts of the valve 9, the tolerances during the process of manufacturing the valve and the wear thereof during its lifetime, the actual relation between the opening duration of the valve and the quantity of fuel flowing therethrough each time it is opened will be approximated rather by the curve 60, the line of which will vary from valve to valve and which can moreover vary for one particular valve during its lifetime. Because of this irregular line of the curve 60 a separate program would have to be written for actuation of each dosing valve 9 which would in addition have to be repeatedly adapted during the lifetime of the valve 9. In order to prevent this, feedback means 16 (FIG. 2) are included in the dosing system according to the present invention. The feedback means 16 are connected to detecting means 11 arranged in the fuel supply line 7. The detecting means 11 comprise a pressure sensor 45 and a temperature sensor 50. Pressure sensor 45 is a so-called differential pressure sensor which determines the pressure difference between a pressure measurement hole 46 located in front of a throttle and a pressure hole 47 located behind the throttle. At each fuel pulse dosed by the valve 9 this pressure difference reaches in each case a maximum value which is recorded and sampled in a block 48. The sampled differential pressure values are transmitted further to a block 49 where they are corrected on the basis of a temperature measured by sensor 50 and subsequently integrated in order to thus determine an equivalent value of the actually dosed fuel flow per unit of time converted to standard conditions. Because the valve 9 doses the fuel 4 in pulses and, also in the case of small dosed fuel flows, the maximum pressure difference thus occurs in the line (and thus the maximum flow speed of the fuel), albeit for a shorter time than with greater fuel flows, the differential pressure measurement can also provide in the case of small fuel flows a very accurate determination of the actual dosed quantity of fuel per unit of time.

The detected quantity of fuel per unit of time is stored together with the associated value for the time the valve 9 is opened (the control signal supplied to the valve 9) in a table 52, wherein the preceding value of the fuel flow detected at this opening duration is overwritten. The table 52 thus always contains the last known relation between the opening duration of valve 9 and the quantity of fuel dosed per unit of time. The control system 2 can hereby always directly retrieve from this table 52 the opening duration associated with a demanded fuel flow. The control system 2 further comprises means for calculating the required fuel flow from the measured engine parameters. These calculating means are connected over a signal line 53 to a block 54 in which the quantity of fuel required per unit of time is converted to a control signal which represents the required opening duration of valve 9. For this purpose the block 54 is connected to table 52. In addition the control signal for the required fuel flow 55 is compared in the block 54 with the signal of the detected fuel flow 53 and on the basis thereof a corrected control signal is generated which is fed via line 57 to a block 15, where it is converted into a current which is transmitted via a line 58 to the pulse width modulation valve 9.

Figure 7:
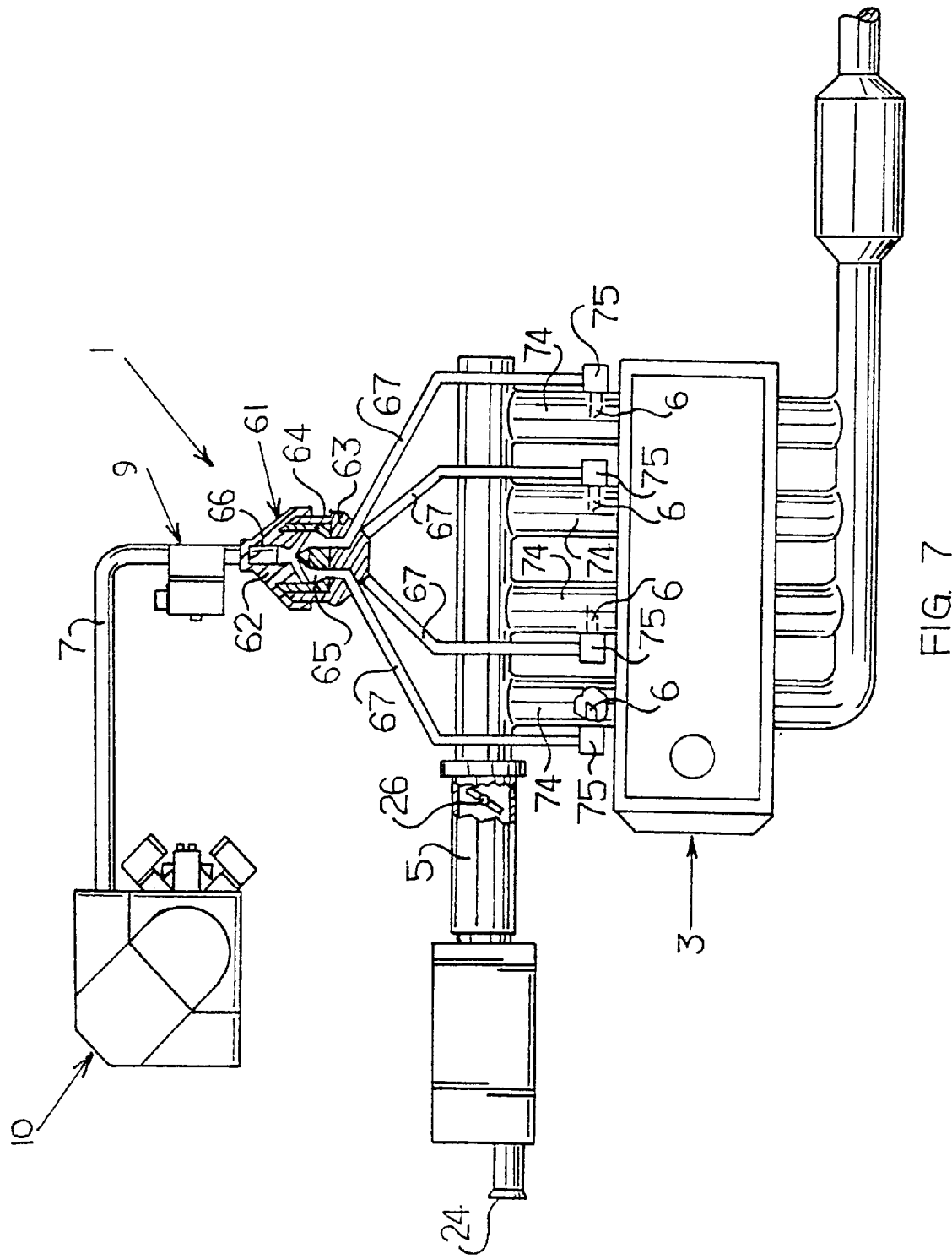
FIG. 7 is a partly sectional schematic view of a multipoint injection system.

For engines with a plurality of cylinders, use can be made of multipoint injection, for which purpose the fuel supply line 7 can debouch downstream of the dosing valve 9 in a distributor block 61 (FIG. 7) where the air-fuel flow is divided into a number of parts which correspond with the number of cylinders 25 and which are guided through separate feed conduits 67 to the cylinders. The distributor block 61 comprises an upper part 62 with central aperture 66 into which debouches the main fuel line 7, a lower part 63 which is in gastight connection to the upper part 62 and onto which the separate conduits 67 are connected, and a middle part 64 with a flow distribution housing 65 arranged therein. In order to prevent the danger of so-called "backfire" (burning of the fuel-air mixture in the intake and/or the fuel supply line), a non-return or one-way valve 75 is arranged in each conduit 67.

Figure 8:
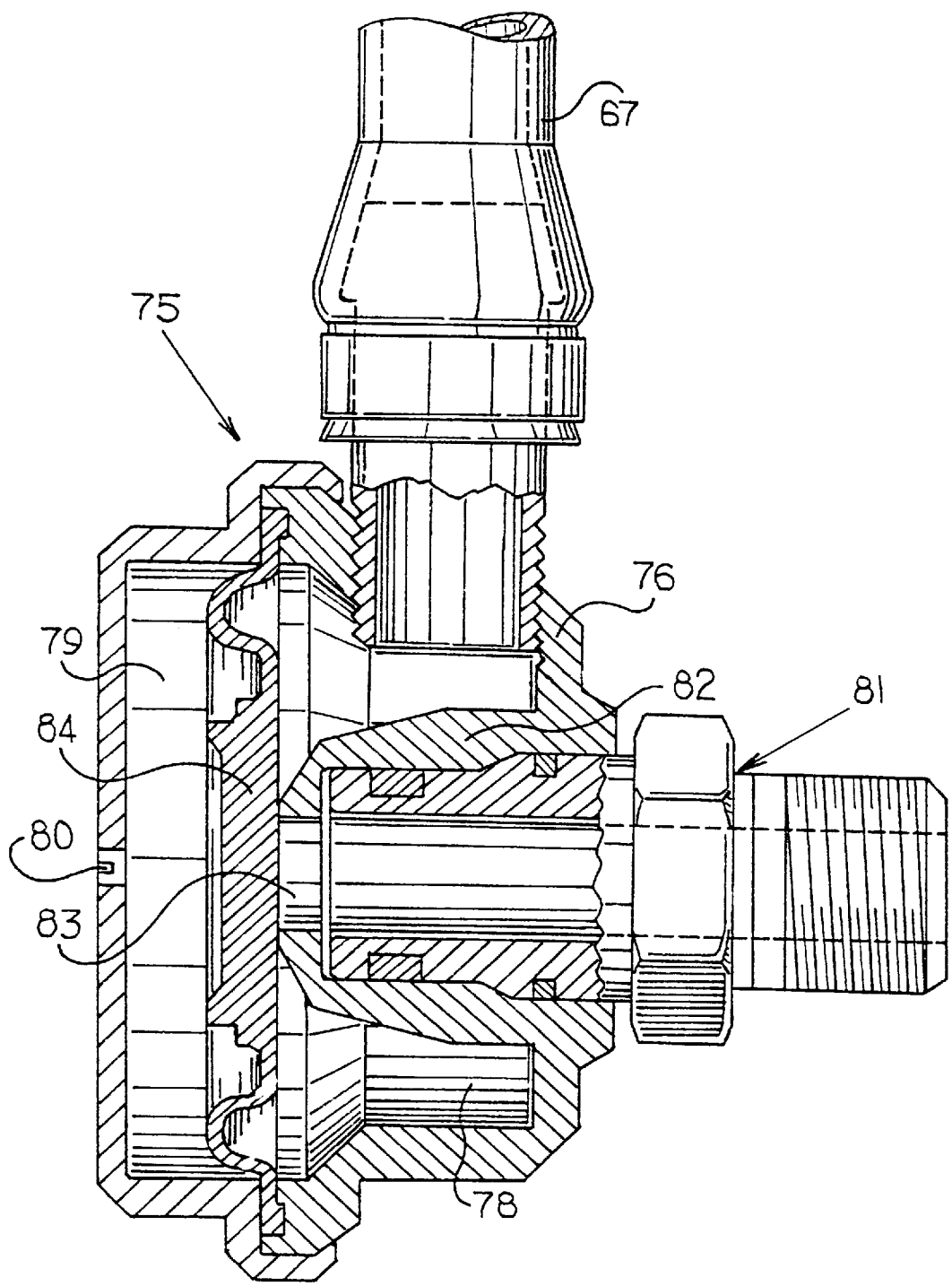
FIG. 8 shows a section of a one-way valve used in the system of FIG. 7.
Figure 9:
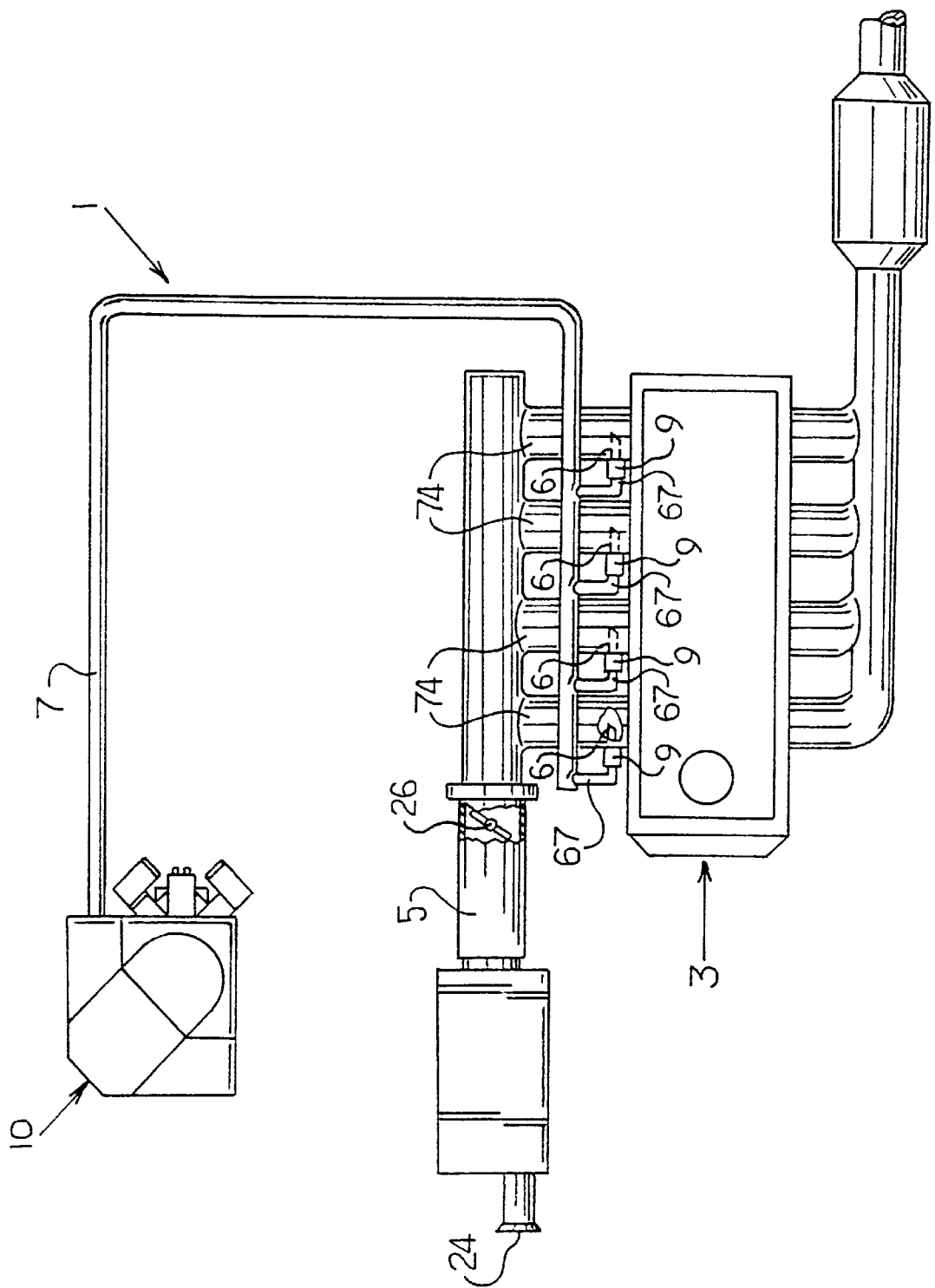
FIG. 9 shows a view corresponding with FIG. 7 of an alternative multipoint injection system.

This non-return valve 75 (FIG. 8) comprises a lower housing 76 and an upper housing 77. The lower housing 76 defines a chamber 78 and the upper housing 77 defines a chamber 79 which is connected to the environment via an opening 80 in the upper housing 77. Further arranged in lower housing 76 is a connecting channel 82 which extends over practically the whole height of lower housing 76 and in which is fixed an outlet nipple 81. The opening of the channel 82 debouching into the space 78 is closed by a diaphragm 83 arranged between lower housing 76 and upper housing 77. As long as the pressure in the vicinity of the non-return valve 75 which also prevails, through opening 80, in the chamber 79 of the upper part 77, is greater than the pressure in the fuel supply line 67, the channel 82 remains closed, whereby the danger of backfire is prevented. In an alternative embodiment of a multipoint injection a pulse width modulation valve 9 is arranged in each separate fuel line (FIG. 9). This embodiment is more expensive but also more accurate.

Although the injection system according to the invention is described above as an LPG injection system, it is equally suitable for other fuels, for instance natural gas, which are vaporous under ambient conditions. For this purpose only the fuel container 8 and supply lines 7 as far as the evaporating means 10 have to be adapted to the pressure necessary to keep such a fuel liquid. When this pressure is very high, as is the case with natural gas (200 bar instead of the pressure of 8–10 bar required for LPG), a pressure reducing valve can further be connected between the evaporating means 10 and the fuel container 8. Possible further adaptations relate only to the control program. The injection system according to the invention therefore offers a greatly increased flexibility compared with conventional injection systems.

Because the injection system according to the invention makes use of the fuel flow per unit of time as control quantity, the control program is in principle independent of the dosing valve 9 used, since the relation between the actually dosed fuel flow and the associated control signal will in any case always be present in table 52.

I claim:

1. A method for dosed supply to a combustion engine of a fuel which is gaseous in ambient conditions, comprising the steps of:

determining a rotation speed and a load of the engine;

calculating a fuel flow per unit of time required at the determined rotation speed and the determined load;

converting the required fuel flow per unit of time into a control signal determining at least one of an opening duration and frequency of a digital fuel valve arranged between a fuel container and the engine;

transmitting the control signal to the digital fuel valve;

detecting the fuel flow per unit of time flowing through the digital fuel valve;

comparing the detected fuel flow to the required fuel flow;

adapting the control signal for the valve on the basis of a difference between the required fuel flow and the detected fuel flow, wherein:

the fuel flow per unit of time through the digital fuel valve is detected by periodically measuring a pressure difference in a line connecting the digital fuel valve and the engine and sampling and integrating the measured values of the pressure difference; and the digital fuel valve includes a closing member continuously moveable between a fully open position and a fully closed position.

2. The method as claimed in claim 1, further including the steps of:

measuring a temperature in the line connecting the digital fuel valve and the engine; and converting the measured value of the pressure difference to the detected fuel flow on the basis of the measured temperature.

3. The method as claimed in claim 2, further including the steps of:

storing the control signal for the digital fuel valve and the fuel flow per unit of time detected therein in a table which can be overwritten; and reading the control signal required from the table at a following calculation of the required fuel flow.

4. The method as claimed in claim 1, further including the steps of:

storing the control signal for the digital fuel valve and the fuel flow per unit of time detected therein in a table which can be overwritten; and reading the control signal required from the table at a following calculation of the required fuel flow.

5. An apparatus for dosed supply to a combustion engine of a fuel which is gaseous in ambient conditions, comprising:

a container for the fuel;

at least one fuel supply line connecting the container to the engine;

at least one controllable dosing means comprising a digital fuel valve arranged in the supply line for dosing the fuel;

means connected for signal generation to the digital fuel valve for calculating a desired fuel flow for dosage per unit of time;

detecting means connected to the fuel supply line for detecting the actually dosed fuel flow per unit of time; and feedback means connecting the detecting means to the digital fuel valve, wherein the digital fuel valve includes a closing member continuously moveable between a fully open position and a fully closed position.

6. The apparatus as claimed in claim 5, wherein the digital fuel valve is a pulse width modulation valve.

7. The apparatus as claimed in claim 6, wherein the detecting means includes a temperature sensor connected to an integrating means.

8. The apparatus as claimed in claim 6, wherein the feedback means includes a table which can be overwritten and which represents a relation between a control signal generated to the dosing means and the detected fuel flow per unit of time.

9. The apparatus as claimed in claim 6, wherein the engine includes a plurality of cylinders, a separate fuel supply conduit is connected to each cylinder and a fuel valve is incorporated in each separate conduit.

10. The apparatus as claimed in claim 6, wherein the engine includes a plurality of cylinders, a separate fuel supply conduit provided with a non-return valve is connected to each cylinder and the dosing means includes a valve arranged in a main fuel supply line and a distributor block placed downstream thereof and connected to the separate feed conduits.

11. The apparatus as claimed in claim 5, wherein the detecting means includes a temperature sensor connected to an integrating means.

12. The apparatus as claimed in claim 11, wherein the feedback means includes a table which can be overwritten and which represents a relation between a control signal generated to the dosing means per detected fuel flow per unit of time.

13. The apparatus as claimed in claim 11, wherein the engine includes a plurality of cylinders, a separate fuel supply conduit is connected to each cylinder and a fuel valve is incorporated in each separate conduit.

14. The apparatus as claimed in claim 11, wherein the engine includes a plurality of cylinders, a separate fuel supply conduit provided with a non-return valve is connected to each cylinder and the dosing means include a valve arranged in a main fuel supply line and a distributor block placed downstream thereof and connected to the separate feed conduits.

15. The apparatus as claimed in claim 5, wherein the feedback means includes a table which can be overwritten and which represents a relation between a control signal generated to the dosing means and the detected fuel flow per unit of time.

16. The apparatus as claimed in claim 15, wherein the engine includes a plurality of cylinders, a separate fuel supply conduit is connected to each cylinder and a fuel valve is incorporated in each separate conduit.

17. The apparatus as claimed in claim 15, wherein the engine includes a plurality of cylinders, a separate fuel supply conduit provided with a non-return valve is connected to each cylinder and the dosing means includes a valve arranged in a main fuel supply line and a distributor block placed downstream thereof and connected to the separate feed conduits.

18. The apparatus as claimed in claim 5, wherein the engine includes a plurality of cylinders, a separate fuel supply conduit is connected to each cylinder and a fuel valve is incorporated in each separate conduit.

19. The apparatus as claimed in claim 5, wherein the engine includes a plurality of cylinders, a separate fuel supply conduit provided with a non-return valve is connected to each cylinder and the dosing means includes a valve arranged in a main fuel supply line and a distributor block placed downstream thereof and connected to the separate feed conduits.

* * * * *

UNITED STATES PATENT AND TRADEMARK OFFICE
CERTIFICATE OF CORRECTION

PATENT NO. : 5,803,057
DATED : September 8, 1998
INVENTOR(S) : Alfred Van de Brink It is certified that error appears in the above-identified patent and that said Letters Patent is hereby corrected as shown below:

On the Title Page, delete "[22] Filed: Sep. 20, 1996" and insert therefor:
```
    --[22]    PCT Filed:  Feb. 20, 1995
      [86]    PCT No.: PCT/NL95/00067
              §371 Date: Sep. 20, 1996
              §102(e) Date: Sep. 20, 1996
      [87]    PCT Pub. No.: WO 95/22691
              PCT Pub. Date: Aug. 24, 1995--.
```

Claim 14 Column 7 Line 25 "include" should read --includes--.

Signed and Sealed this

Second Day of February, 1999

Attest:

Attesting Officer

*Acting Commissioner of Patents and Trademarks*